GARRETT & STECKEL.
Car Axle.
No. 21,604.
Patented Sept. 28, 1858.
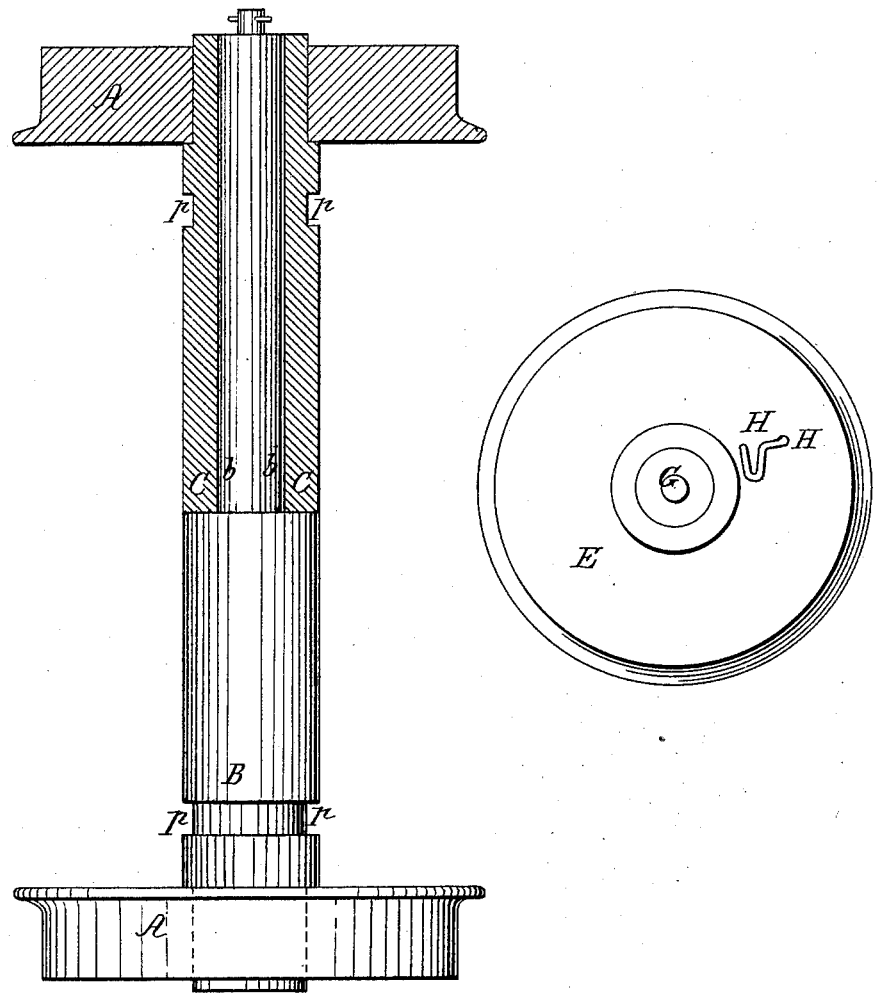
Witnesses:
Henry Forker
Als. McCartney
Inventor:
J. P. Garrett
Daniel Stokel

UNITED STATES PATENT OFFICE.

J. P. GARRETT AND DANIEL STECKEL, OF MERCER, PENNSYLVANIA.

COMPOUND RAILROAD-AXLE.

Specification of Letters Patent No. 21,604, dated September 28, 1858.

*To all whom it may concern:*

Be it known that we, J. P. GARRETT and DANIEL STECKEL, of the county of Mercer and State of Pennsylvania, have invented a new and Improved Axle for Locomotives, Cars, Trucks, &c.; and we hereby declare that the following is a full and exact description thereof, reference being had to the accompanying drawings and to the letters of reference marked thereon, the description of the invention being as follows, to wit:

The main axle is the length of the width of the track and passing also through both wheels from half length between the wheels the axle to its termination at one end is reduced in size and the reduced part revolves as a journal in the tubular portion of the axle of half of the whole length which is as well as the main axle permanently fastened in the wheels. The wheels being thus independent of each other and the action compensatory enables the wheels passing on the outside rail of a curvature to keep pace with the wheels on the inner track moving at all times on or nearly at a right angle with the rails whether the radius be 50 or 500 feet, thus removing the friction and the necessity of the wheels (on the axle now in use) on the longer rails to keep up by jumping, as the revolutions or motion of the wheels when on a curve are upon the journal revolving in the tubular portion of the axle instead of being upon the usual bearings which come into action on a straight line.

What we claim is—

A compound axle the main portion of which extends through both wheels and equals in length the width of the track and is reduced in size from its center to one end in combination with a tubular axle of half its length in which the reduced part of the main axle revolves as in a journal, one wheel being secured to the main axle and the other to the tubular part arranged substantially as described.

May 1st 1856.

J. P. GARRETT.
DANIEL STECKEL.

Witnesses:
   HENRY FORKER,
   ALEX. MCCARTNEY.